US010619583B2

(12) United States Patent
Nozeran et al.

(10) Patent No.: US 10,619,583 B2
(45) Date of Patent: Apr. 14, 2020

(54) METHOD AND DEVICE FOR ACTUATING A PIEZO ACTUATOR OF AN INJECTION VALVE OF A FUEL INJECTION SYSTEM OF AN INTERNAL COMBUSTION ENGINE

(71) Applicant: CONTINENTAL AUTOMOTIVE GMBH, Hannover (DE)

(72) Inventors: Nicolas Nozeran, Tegernheim (DE); Tany Gargiso, Donaustauf (DE); Hans-Jörg Wiehoff, Regensburg (DE)

(73) Assignee: Vitesco Technologies GmbH, Hannover (DE)

( * ) Notice: Subject to any disclaimer, the term of this patent is extended or adjusted under 35 U.S.C. 154(b) by 149 days.

(21) Appl. No.: 15/738,521

(22) PCT Filed: Jun. 15, 2016

(86) PCT No.: PCT/EP2016/063791
§ 371 (c)(1),
(2) Date: Dec. 20, 2017

(87) PCT Pub. No.: WO2017/001198
PCT Pub. Date: Jan. 5, 2017

(65) Prior Publication Data
US 2018/0187616 A1 Jul. 5, 2018

(30) Foreign Application Priority Data
Jul. 2, 2015 (DE) .................. 10 2015 212 378

(51) Int. Cl.
*F02D 41/02* (2006.01)
*F02D 41/00* (2006.01)
(Continued)

(52) U.S. Cl.
CPC ......... *F02D 41/008* (2013.01); *F02D 41/064* (2013.01); *F02D 41/2096* (2013.01);
(Continued)

(58) Field of Classification Search
CPC .. F02D 41/008; F02D 41/064; F02D 41/2096; F02D 41/2467; F02D 41/40; F02M 51/0603; F02M 47/027
See application file for complete search history.

(56) References Cited

U.S. PATENT DOCUMENTS

2002/0117149 A1 8/2002 Igashira et al.
2008/0006243 A1* 1/2008 Fujii ................... F02D 41/2096
123/472
2008/0017173 A1 1/2008 Fujii

FOREIGN PATENT DOCUMENTS

DE 10016474 A1 10/2001
DE 10238241 A1 3/2004
(Continued)

OTHER PUBLICATIONS

Korean Office Action dated Nov. 5, 2018 for corresponding Korean application 10-2017-7036818.
(Continued)

*Primary Examiner* — Hai H Huynh
*Assistant Examiner* — Gonzalo Laguarda

(57) ABSTRACT

The invention relates to a method and a device for actuating an injection valve, which has a piezo actuator and a nozzle needle, of a fuel injection system of an internal combustion engine, in which method a control unit, in a manner dependent on a setpoint stroke height of the piezo actuator in successive injection cycles, outputs a control signal for changing the actual stroke height of the piezo actuator, characterized in that the control unit changes the setpoint stroke height of the piezo actuator, for compensation of the temperature dependency of the capacitance of the piezo actuator, in a manner dependent on the temperature of said piezo actuator.

4 Claims, 3 Drawing Sheets

(51) Int. Cl.
  *F02M 51/06* (2006.01)
  *F02D 41/40* (2006.01)
  *F02D 41/06* (2006.01)
  *F02D 41/20* (2006.01)
  *F02D 41/24* (2006.01)
  *F02M 45/12* (2006.01)

(52) U.S. Cl.
  CPC ......... *F02D 41/2467* (2013.01); *F02D 41/40* (2013.01); *F02M 51/0603* (2013.01); *F02D 2041/2065* (2013.01); *F02D 2200/021* (2013.01); *F02D 2200/063* (2013.01); *F02M 45/12* (2013.01); *F02M 2200/21* (2013.01); *Y02T 10/44* (2013.01)

(56) References Cited

FOREIGN PATENT DOCUMENTS

| | | |
|---|---|---|
| DE | 10318647 A1 | 12/2004 |
| DE | 10329617 A1 | 1/2005 |
| DE | 102004028612 A1 | 12/2005 |
| DE | 102007059115 A1 | 6/2009 |
| DE | 102008029799 A1 | 12/2009 |
| DE | 102009003176 A1 | 11/2010 |
| DE | 102011075732 A1 | 11/2012 |
| DE | 102012204278 A1 | 9/2013 |
| DE | 102012212195 A1 | 1/2014 |
| DE | 102012222097 A1 | 6/2014 |
| EP | 1811164 A1 | 7/2007 |
| EP | 2037109 A1 | 3/2009 |
| WO | 0250413 A1 | 6/2002 |
| WO | 03091559 A1 | 11/2003 |

OTHER PUBLICATIONS

International Search Report and Written Opinion dated Sep. 9, 2016 from corresponding International Patent Application No. PCT/EP2016/063791.

Search Report dated Mar. 7, 2016 from corresponding German Patent Application No. 10 2015 212 378.2.

* cited by examiner

METHOD AND DEVICE FOR ACTUATING A PIEZO ACTUATOR OF AN INJECTION VALVE OF A FUEL INJECTION SYSTEM OF AN INTERNAL COMBUSTION ENGINE This application claims the benefit of International application No. PCT/EP2016/063791, filed Jun. 15, 2016, which claims priority to German patent application No. 10 2015 212 378.2, filed Jul. 2, 2015, each of which is hereby incorporated by reference.

FIELD OF INVENTION

The invention relates to a method and a device for actuating a piezo actuator of an injection valve of a fuel injection system of an internal combustion engine.

BACKGROUND

It is already known for the injection valves of a fuel injection system to be actuated such that they are opened and closed again as exactly as possible at predefined points in time in order to inject as accurately as possible a predefined quantity of a pressurized fuel into a cylinder of the internal combustion engine. In this way, and possibly also by means of additional pre- and/or post-injections in addition to a main injection within an injection cycle, the efficiency of the internal combustion engine can be increased, and exhaust-gas and noise emissions can simultaneously be reduced.

An injection valve, commonly also referred to as injector, has a closure element which can be moved by means of a drive for the opening and closing of the injector. In the closed state of the injector, in which no injection is performed, the closure element is situated in a closed position, in which it closes all of the injection openings of the injector. By means of the drive, the closure element can be lifted proceeding from its closed position, in order to thereby open up at least some of the injection openings and initiate the injection.

The closure element commonly has, or is commonly designed as, a nozzle needle. In its closed position, said nozzle needle is seated on a needle seat of the injector. The drive of the injector comprises, for moving the closure element, an actuator which is designed to, in a manner dependent on a control signal, lift the closure element out of the closed position to a stroke height, hold said closure element at said stroke height, and/or move the closure element back into the closed position. For example, said actuator may be provided by a piezo element, which expands or contracts owing to electrical charging or discharging processes and thereby initiates a stroke or closing movement of the closure element. Such actuators, also referred to as piezo actuators, are particularly highly suitable for precise and delay-free movement of the closure element. This is the case in particular with so-called directly driven piezo injectors, in the case of which a direct and delay-free transmission of force between the piezo actuator and the closure element is made possible.

DE 10 2011 075 732 A1 has disclosed a regulation method for an injection valve and an injection system. In said known method, in repeating injection cycles and in a manner dependent on a setpoint stroke height of a closure element of the injection valve, in each case at least one control signal for actuating a drive of the injection valve is generated, wherein the drive is actuated by means of the control signal for lifting the closure element to the setpoint stroke height, and the closure element is lifted by means of the drive to an actual stroke height, wherein at least one measurement variable which correlates with the actual stroke height is detected, and the actual stroke height is determined in a manner dependent on said at least one measurement variable, wherein the control signal is generated, in at least one of the subsequent injection cycles, in a manner dependent on a deviation of the actual stroke height from the setpoint stroke height.

SUMMARY

The invention is based on the object of specifying a method for actuating a piezo actuator of an injection valve of a fuel injection system of an internal combustion engine, which method is better suited to the conditions that arise in practical operation.

Said object is achieved by means of a method having the features specified in claim 1. Advantageous embodiments and refinements of the invention are specified in the dependent claims.

In the present invention, the actuation of the piezo actuator of an injection valve of a fuel injection system is performed in a manner dependent on the injector temperature, which can generally be inferred from the engine temperature. In the case of operation with a hot injector, the piezo actuator is actuated such that the maximum needle stroke is achieved, in order to achieve complete dethrottling of the valve needle and thus a maximum fuel throughflow. In the case of operation with a cold injector, the piezo actuator is actuated such that the needle stroke is not at a maximum, such that complete dethrottling of the valve needle is not achieved, and the fuel throughflow is reduced. Said reduced fuel throughflow is compensated by means of an increase of the actuation duration of the piezo actuator.

The advantages of this approach consist in particular in that the actuation hardware of the fuel injection system merely has to be designed such that, during hot operation, it can ensure the maximum needle stroke for complete dethrottling, and thus a maximum fuel throughflow. During cold operation, the demands on the actuation hardware of the fuel injection system are reduced. This approach consequently makes it possible for the electrical demands on the actuation hardware of the fuel injection system to be reduced. This permits the use of lower-cost actuation hardware of the fuel injection system, wherein the actuation hardware is the electronic control unit of the fuel injection system including an associated output stage.

BRIEF DESCRIPTION OF THE DRAWINGS

Further advantageous characteristics of the invention will emerge from the discussion thereof below on the basis of the figures, in which.

DETAILED DESCRIPTION

Figure 1:
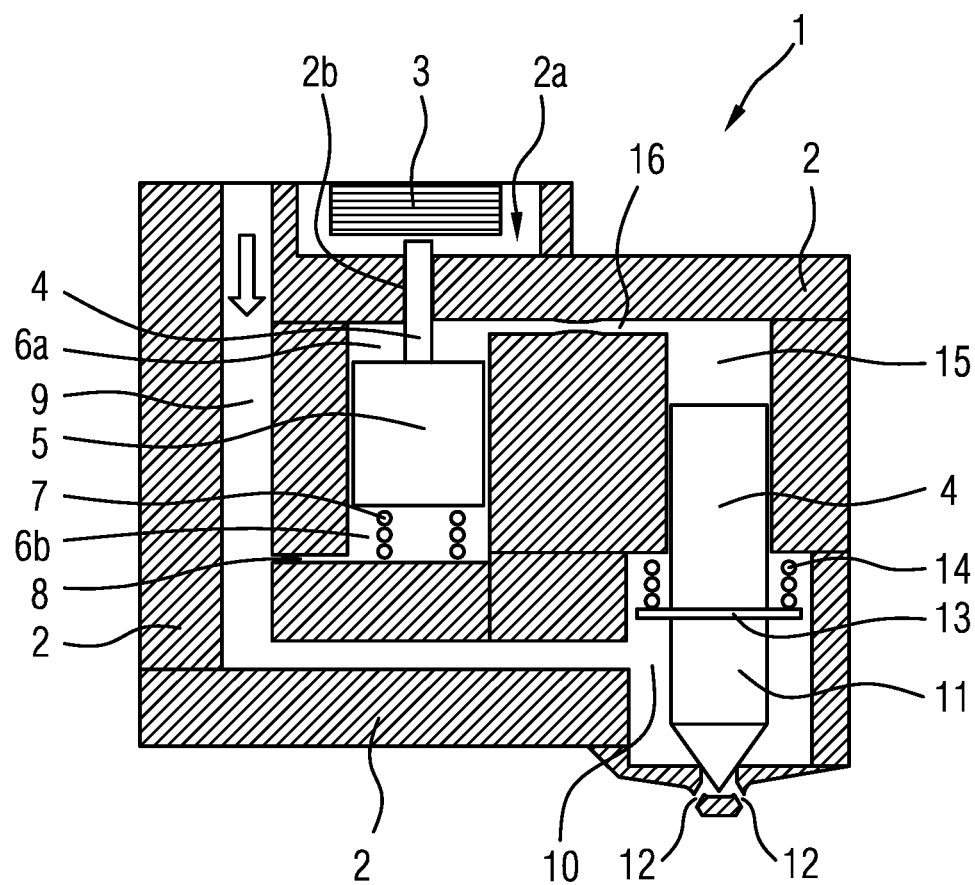
FIG. 1 shows a sketch of an injection valve of a fuel injection system.
Figure 1:
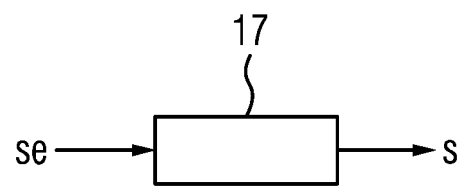

FIG. 1 shows a sketch of an injection valve of a fuel injection system. The illustrated injection valve 1 has an injector body 2 which, in the exemplary embodiment shown, is of multi-part form. The injector body 2 has, in its upper part, an actuator recess 2a, in which a piezo actuator 3 is arranged. Furthermore, the injector body 2 has a transmission pin recess 2b, through which a transmission pin 4 is guided. The transmission pin 4 serves for the coupling of the piezo actuator 3 to a control piston 5 arranged in a control piston recess 6 of the injector body 2, wherein a first part 6a of the control piston recess 6 is arranged above the control piston 5, and a second part 6b of the control piston recess 6 is arranged below the control piston 5. In the second part 6b, arranged below the control piston, of the control piston recess 6, there is arranged a control piston spring 7, which is supported on a surface, which downwardly delimits the control piston recess 6, of the injector body 2. The upper end of the control piston spring 7 is supported on the bottom side of the control piston 5.

The second part 6b, provided below the control piston 5, of the control piston recess 6 is connected via a connecting bore 8 to a high-pressure fuel line 9, through which highly pressurized fuel is fed to the injection valve 1 and conducted through the injector body into a nozzle chamber 10 of the injector body 2. In said nozzle chamber 10 there is positioned a nozzle needle which is movable in its axial direction in the nozzle chamber 10. In the non-actuated state of the piezo actuator 3, injection openings 12 provided in the injector body 2 are closed by means of the nozzle needle 11. In the actuated state of the piezo actuator 3, one or more of the injection openings 12 provided in the injector body 2 are opened.

The nozzle needle 11 has a web 13 which projects therefrom in a radial direction. Between said web 13 and the upper terminating wall of the nozzle chamber 10 there is arranged a nozzle spring 14, by means of the force of which the nozzle needle is, in the non-actuated state of the piezo actuator 3, pushed downward in order to reliably close the injection openings 12.

The upper end region of the nozzle needle 11 is guided by a further recess 15 in the injector body 2, which is narrower than the nozzle chamber 10.

When the piezo actuator 3 is actuated, the upper end region of the nozzle needle 11 is moved upward within said further recess 15, wherein, as a result of said movement, the lower end region of the nozzle needle is lifted from its sealing seat and opens up the injection openings 12.

The dimensions of the nozzle chamber 10 and of the further recess 15 are selected such that, even in the fully open state of all of the injection openings 12, the upper terminating surface of the nozzle needle does not abut against a stop of the injector body 2, that is to say the nozzle needle 12 is moved upward without striking a stop during the opening of the injection openings.

The further recess 15 is coupled, in its upper end region, via a further connecting bore 16 to the first part 6a, provided above the control piston 5, of the control piston recess 6. Owing to said coupling, the further recess 15 and the first part 6a of the control piston recess 6 form an equalization chamber, via which hydraulic pressure equalization can take place.

Also illustrated in FIG. 1 is a control unit 17 which, evaluating sensor signals se fed thereto and using a stored operating program and stored characteristic maps, tables and/or characteristic curves, outputs control signals s for the actuable components of the injection valve 1.

Tests have shown that the capacitance of a piezo actuator is dependent on its temperature. Piezo actuators have a lower capacitance in the presence of low temperatures than in the presence of high temperatures. To achieve the same stroke of the valve needle, it is consequently necessary for the voltage applied to the piezo actuator to be higher in the presence of low temperatures than in the presence of relatively high temperatures.

This will be discussed below on the basis of FIGS. 2 and 3.

Figure 2:
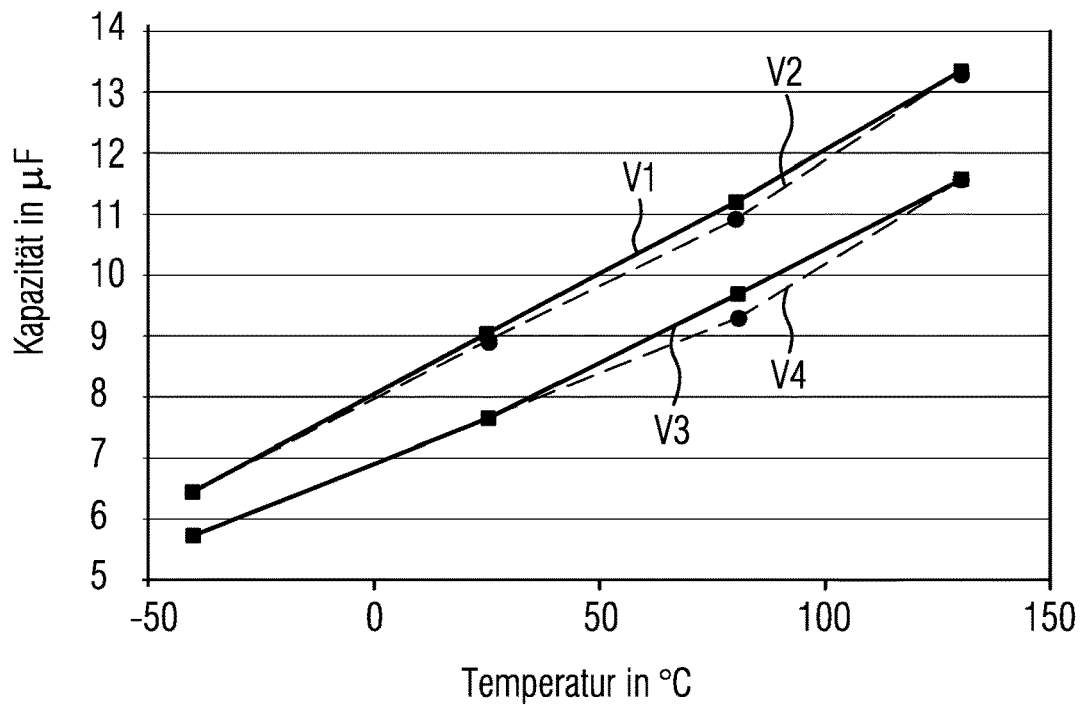
FIG. 2 shows a diagram illustrating the profile of the capacitance of the piezo actuator versus the temperature.

FIG. 2 shows a diagram illustrating the profile of the capacitance of the piezo actuator in a manner dependent on the temperature for two different types of piezo actuators. Here, the capacitance is in each case that which takes effect in the case of a stroke of the valve needle of 80 μm.

Here, the profile V1 denotes the profile of the capacitance of a first example of a first type of piezo actuators in a manner dependent on the temperature, the profile V2 denotes the profile of the capacitance of a second example of the first type of piezo actuators, the profile V3 denotes the profile of the capacitance of a first example of a second type of piezo actuators in a manner dependent on the temperature, and the profile V4 denotes the profile of the capacitance of a second example of the second type of piezo actuators.

Owing to the different capacitance, a different actuation voltage takes effect. Here, the relatively highest voltages are necessary for equal rail pressures and low temperatures.

Figure 3:
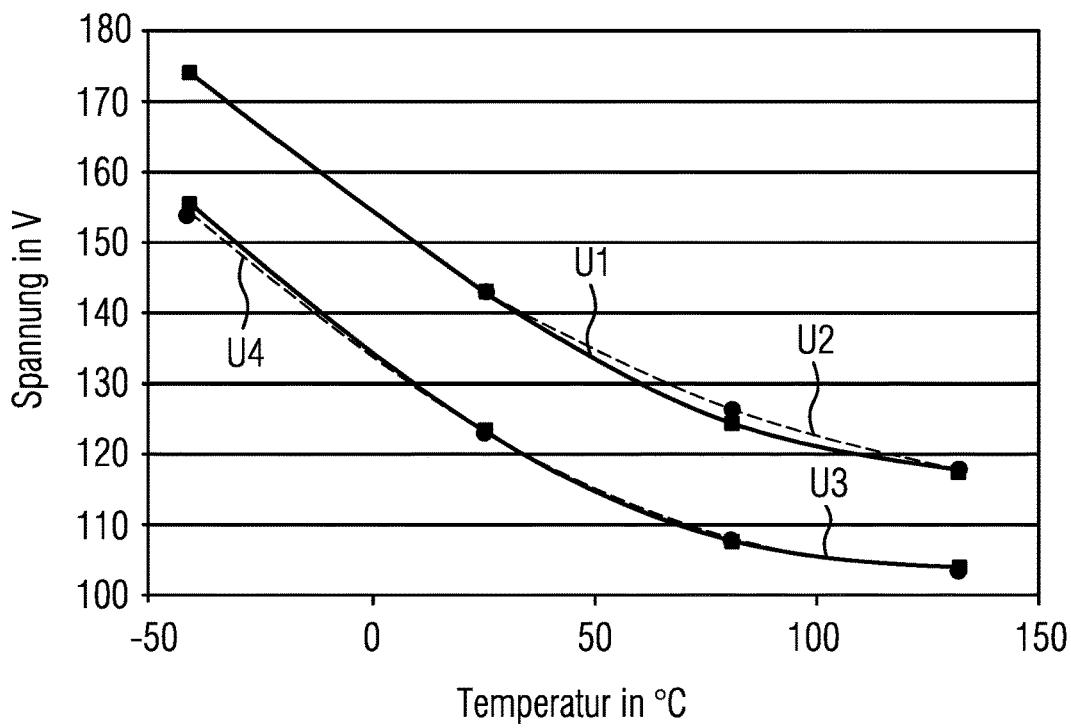
FIG. 3 shows a diagram illustrating the profile of the actuation voltage of the piezo actuator versus the temperature thereof.

FIG. 3 shows a diagram illustrating the profile of the voltage in a manner dependent on the temperature for two different types of piezo actuators. The voltage is in each case that which is required to realize a stroke of the valve needle of 80 μm. Here, the profile U1 denotes the profile of the voltage for the first example of the first type of piezo actuators in a manner dependent on the temperature, the profile U2 denotes the profile of the voltage of the second example of the first type of piezo actuators, the profile U3 denotes the profile of the voltage of the first example of the second type of piezo actuators, and the profile U4 denotes the profile of the voltage of the second example of the second type of piezo actuators.

The abovementioned voltages for the actuation of the respective piezo actuator must be provided by respectively suitable actuation hardware. This is associated with relatively high hardware costs, which are necessary only in the presence of low temperatures.

In the case of some previously used concepts for the direct drive of a piezo injector, it was not possible to set a maximum rail pressure of 2000 bar in the presence of low temperatures, because otherwise the actuation voltage of the piezo actuator would have exceeded a maximum admissible limit value of 210 V. As a result, it was necessary for the maximum pressure of the fuel in the rail to be limited in a temperature-dependent manner until the injector reached its expected operating temperature, which correlates with an increase in its actuator capacitance.

An alternative solution in previously used concepts consists in configuring the actuation hardware of the piezo injector such that it is suitable for providing the required high voltage. Since said high voltage is however required only in the presence of low temperatures, the actuation hardware is in this case overdimensioned, giving rise to relatively high hardware costs.

By contrast, in the case of the present invention, it is no longer sought to achieve always the same needle stroke independently of the present temperature. Rather, in the case of the present invention, the setpoint stroke height of the piezo actuator is changed in a manner dependent on the present temperature. Here, provision is made in particular for the degree of dethrottling of the valve needle to be reduced in the presence of low temperatures in order to reduce the electrical demands on the actuation hardware of the injection system. To achieve this aim, the piezo actuator is actuated with a relatively low voltage, which leads to the desired relatively small needle stroke. This reduced needle stroke leads to a smaller maximum throughflow. This smaller maximum throughflow is compensated by means of a corresponding increase of the actuation duration. In the presence of relatively low temperatures, this approach, which is changed in relation to the prior art, has only a very small influence on the combustion process and on the fuel injection system as a whole.

By contrast, in the presence of high temperatures, in particular in the presence of the normal operating temperature of the injection system, provision is made for the maximum needle stroke to be realized in order to achieve as far as possible complete dethrottling of the valve needle.

Figure 4:
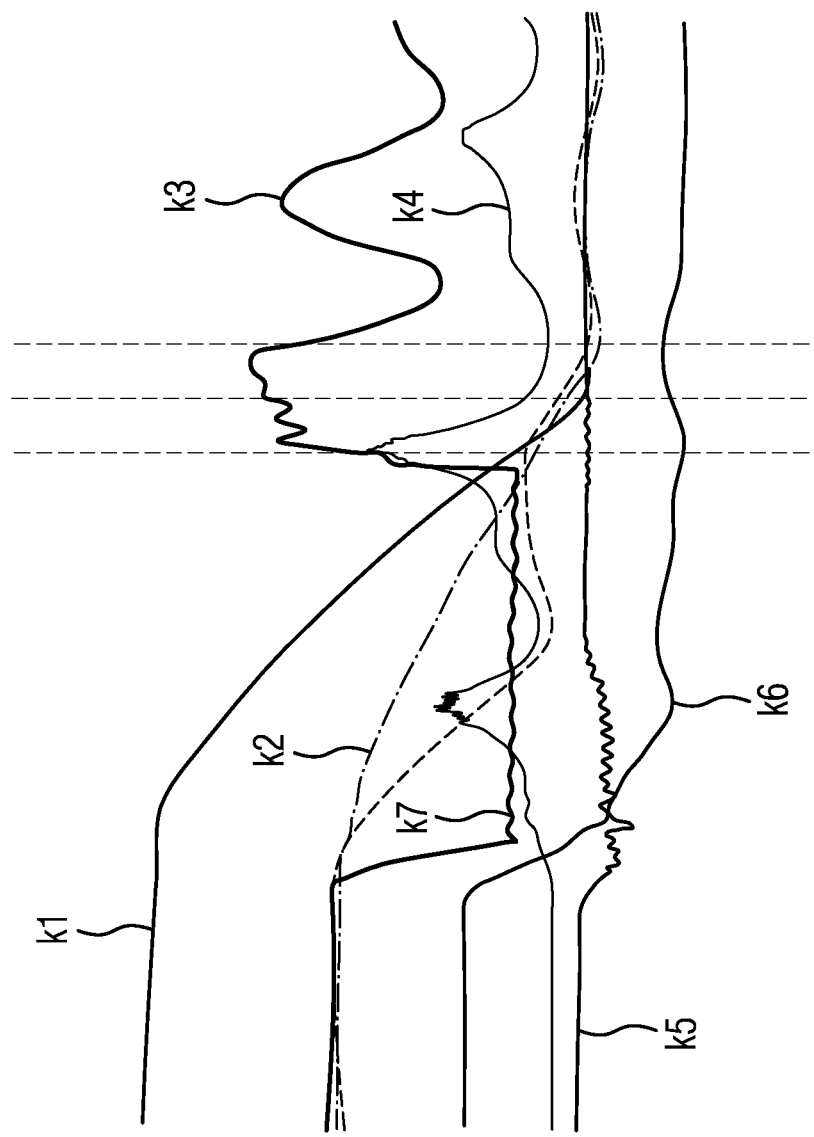
FIG. 4 shows a diagram illustrating the closing phase of the valve needle.

FIG. 4 shows a diagram illustrating the closing phase of the valve needle. Said diagram illustrates the profile k1 of the needle stroke, the profile k2 of the stroke of the control piston, the profile k3 of the piezo force, the profile k4 of the capacitance, the profile k5 of the current, the profile k6 of the voltage and the profile k7 of the stroke of the piezo actuator. In particular, it can be seen from FIG. 4 that the needle stroke correlates with the energy and that the needle stroke also correlates with the closing time. It is thereby ensured that a smaller needle stroke also entails less energy. Since the closing time can be detected, the needle stroke can be monitored on the basis of the detected closing time and corrected if necessary.

In the case of the present invention, it follows that the demands on the actuation hardware of the fuel injection system are reduced by virtue of the setpoint needle stroke being changed in a manner dependent on the present temperature, wherein in particular, the setpoint needle stroke is reduced in the presence of a low temperature in order to reduce the maximum actuation voltage of the piezo actuator.

The invention claimed is:

1. A method for actuating an injection valve, the injection valve comprising a piezo actuator and a nozzle needle, of a fuel injection system of an internal combustion engine, the method comprising:

at a control unit, dependent on a setpoint stroke height of the piezo actuator in successive injection cycles, outputting a control signal configured to change the stroke height of the piezo actuator, wherein the control unit changes the setpoint stroke height of the piezo actuator, for compensation of temperature dependency of a capacitance of the piezo actuator, dependent on temperature of said piezo actuator, wherein the control unit predefines a smaller setpoint stroke height of the piezo actuator in presence of a relatively low temperature than in presence of a relatively high temperature, and wherein the control unit predefines a longer actuation duration of the piezo actuator in presence of a relatively low temperature than in presence of a relatively high-temperature.

2. The method as claimed in claim 1, wherein, in the presence of an operating temperature of the internal combustion engine, the control unit predefines the setpoint stroke height of the piezo actuator causing complete dethrottling of the nozzle needle.

3. A device for actuating an injection valve, the injection valve comprising a piezo actuator and a nozzle needle, of a fuel injection system of an internal combustion engine, the device comprising:

a control unit configured to, in a manner dependent on a setpoint stroke height of the piezo actuator in successive injection cycles, output a control signal configured to change the stroke height of the piezo actuator, wherein the control unit further configured to change the setpoint stroke height of the piezo actuator, for compensation of temperature dependency of the piezo actuator, in a manner dependent on temperature, wherein the control unit predefines a smaller setpoint stroke height of the piezo actuator in presence of a relatively low temperature than in presence of a relatively high temperature, and wherein the control unit predefines a longer actuation duration of the piezo actuator in presence of a relatively low temperature than in presence of a relatively high temperature.

4. The device of claim 3, wherein, in the presence of an operating temperature of the internal combustion engine, the control unit predefines the setpoint stroke height of the piezo actuator causing complete dethrottling of the nozzle needle.

* * * * *